United States Patent [19]

Schieck

[11] Patent Number: 5,442,388
[45] Date of Patent: Aug. 15, 1995

[54] METHOD AND MEANS FOR CORRECTING LATERAL REGISTRATION ERRORS

[75] Inventor: Richard A. Schieck, Rochester, N.Y.

[73] Assignee: Xerox Corporation, Stamford, Conn.

[21] Appl. No.: 821,526

[22] Filed: Jan. 16, 1992

[51] Int. Cl.⁶ .......................................... G01D 15/06
[52] U.S. Cl. .................... 347/116; 347/118
[58] Field of Search .............. 346/157, 153.1, 160, 346/107 R

[56] References Cited

U.S. PATENT DOCUMENTS

| | | | |
|---|---|---|---|
| Re. 32,967 | 6/1989 | St. John et al. | 242/57.1 |
| 4,007,489 | 2/1977 | Helmberger et al. | 358/78 |
| 4,135,664 | 1/1979 | Resh | 235/475 |
| 4,569,584 | 2/1986 | St. John et al. | 355/14 |
| 4,660,059 | 4/1987 | O'Brien | 346/157 |
| 4,816,844 | 3/1989 | Uchida et al. | 346/160 |
| 4,829,326 | 5/1989 | Emmett et al. | 346/157 |
| 4,839,674 | 6/1989 | Hanagata et al. | 346/136 |
| 4,903,067 | 2/1990 | Murayama et al. | 346/160 |
| 4,912,491 | 3/1990 | Hoshino et al. | 346/160 |
| 4,942,405 | 7/1990 | Dody et al. | 346/107 R |
| 4,961,089 | 10/1990 | Jamzadeh | 355/207 |
| 4,963,899 | 10/1990 | Resch, III | 346/157 |
| 4,965,597 | 10/1990 | Ohigashi et al. | 346/157 |
| 5,040,003 | 8/1991 | Wills | 346/157 |
| 5,076,163 | 12/1991 | Sainio | 101/181 |
| 5,159,357 | 10/1992 | Ng et al. | 346/157 |
| 5,225,848 | 7/1993 | Smith et al. | 346/107 A X |
| 5,323,180 | 6/1994 | Kuberka et al. | 346/76 L |

FOREIGN PATENT DOCUMENTS

239390A1  9/1986  German Dem. Rep. .
5598016A  5/1980  Japan .

*Primary Examiner*—Steven L. Stephan
*Assistant Examiner*—Randy W. Gibson
*Attorney, Agent, or Firm*—Lloyd F. Bean, II

[57] ABSTRACT

A method and means for compensating for lateral registration errors in printing machines of the type having a plurality of image processing stations for forming a composite image on an imageable surface which moves relative to the stations. The invention includes monitoring means for determining the angular displacement of the surface from a reference in the process direction to thereby determine the lateral registration error at each of the image processing stations. Actuating means are provided to move the image processing stations laterally relative to the surface to provide lateral registration of the images formed on the surface. The invention may also include means for compensating for process direction registration errors including monitoring means for determining the angular displacement of the surface from a reference in lateral direction at each of the image processing stations and providing means to rotate the image processing stations relative to the surface to provide process direction registration of the images formed on the surface.

7 Claims, 5 Drawing Sheets

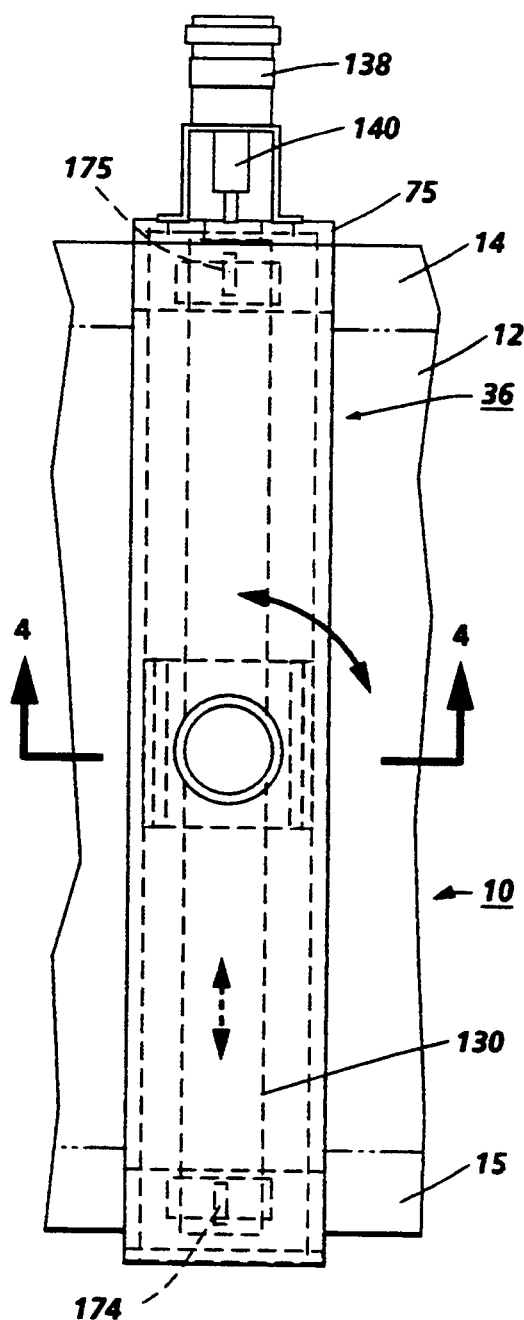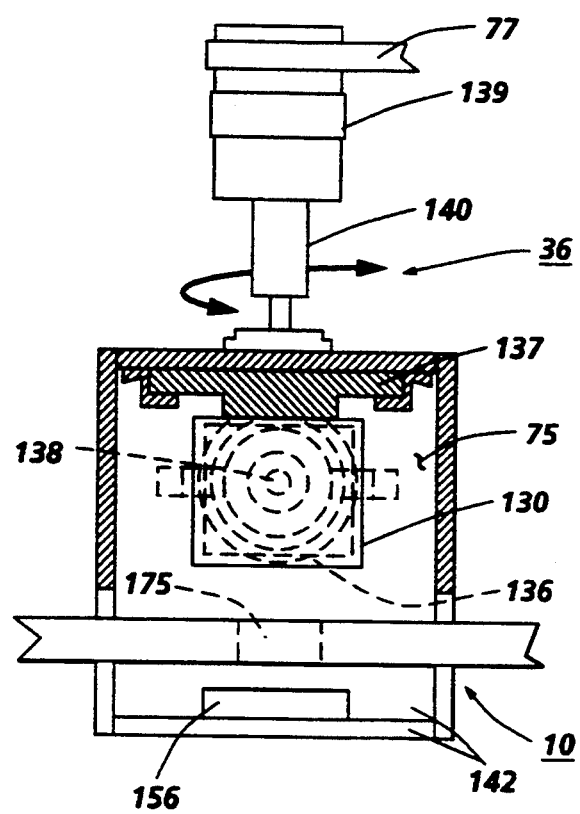
FIG. 3
FIG. 4

METHOD AND MEANS FOR CORRECTING LATERAL REGISTRATION ERRORS

FIELD OF THE INVENTION

This invention relates generally to a means and method for positionally tracking a continuous moving web, and more particularly a means and method for positionally tracking a moving photoconductive web in an electrophotographic printer to permit superposing registered latent images exposed on the web so that the images are aligned in both the process and lateral directions.

INCORPORATION BY REFERENCE

Applicants hereby reference and incorporate by reference thereto, U.S. Pat. No 4,660,059, and co-pending patent applications U.S. patent application Ser. No. 07/807,931 entitled Method and Apparatus for Aligning Multiple Image Print Bars in a Single Pass System, filed on Dec. 16, 1991 by Stephen C. Corona and George A. Charnitski and assigned Attorney Docket No. D/91032 and U.S. patent application Ser. No. 07/807,927 entitled Method and Apparatus for Image Registration in a Single Pass ROS System, filed on Dec. 16, 1991 by Daniel W. Costanza and William J. Nowak and assigned Attorney Docket No. D/91032Q.

BACKGROUND OF THE INVENTION

Single pass electrographic printers including, by way of example, electrophotographic printers employing xerographic technology having more than one process station which provide sequential images to form a composite image require critical control of the registration of each of the sequenced images. This is particularly true in color printers, which produce each sequence of the composite image separately to form a final multicolor image. Failure to achieve registration of the images yields printed copies which have misaligned pixels. This condition is generally obvious upon viewing of the copy, as such copies usually exhibit fuzzy color separations, bleeding or other errors which make such copies unsuitable for intended uses.

Means to provide a simple, relatively inexpensive, and accurate means to provide proper registration of latent images superposed in such printing systems has been a goal of persons involved in the design, manufacture and use of electrographic printers. This need has been particularly recognized by those in the color and highlight color portion of the xerography art, the need for such a means to provide accurate and inexpensive registration has become more acute, as the demand for high quality, relatively inexpensive color images, and thus, color printers and copiers to produce them has increased. Various methods of means have been proposed and used but they have not been entirely satisfactory.

The following patents and applications may be relevant to various aspects of this invention:

U.S. Pat. No. 4,912,491 Patentee: Hoshino et al. Issued: Mar. 27, 1990

U.S. Pat. No. Re. 32,967 Patentee: St. John et al. Issued: Jun. 27, 1989

Japanese Patent No. 55-981016 Patentee: Honda Issued: Jul. 25, 1980

U.S. Pat. No. 4,135,664 Patentee: Resh Issued: Jan. 23, 1979

U.S. Pat. No. 4,963,899 Patentee: Resch, III Issued: Oct. 16, 1990

GDR-A-239,390 Patentee: Schmeer et al. Issued: Sep. 24, 1986

U.S. Pat. No. 4,569,584 Patentee: St. John et al. Issued: Feb. 11, 1986

U.S. Pat. No. 4,961,089 Patentee: Jamzadeh Issued: Oct. 2, 1990

The disclosures of these references are briefly summarized as follows:

U.S. Pat. No. 4,912,491 to Hoshino discloses an apparatus for forming superimposed images as well as forming registration marks corresponding to the position of the images associated therewith. The registration marks are formed apart from the imaging portion of the medium and are formed in a transparent area so as to be illuminable from below. Thus, detectors detect the position of the registration marks as the marks pass between the illuminated areas. The detection/sensing of marked position is used in determining proper registration positioning whereby the image forming devices may be adjusted to achieve such registration.

U.S. Pat. No. 32,967 to St. John et al., a reissue of U.S. Pat. No. 4,485,982, issued Dec. 4, 1984, discloses a web tracking system for a continuous web which passes along a predetermined path through one or more processing stations. The tracking system has aligned tracking indicia on one or both sides of the web and means are provided for sensing these indicia which are indicative of dimensional changes in width and length of the web at a particular point and further there is also provided an edge sensor to determine movement of the web itself.

Japanese Patent No. 55-981016 dated Jul. 25, 1980, assigned to Ricoh discloses means for compensating for errors the process direction of movement of the belt by rotation of shafts which engage the tension and drive rollers of the belt. Upon detection of movement of the belt in a non-linear fashion (e.g., the edge exhibiting a zigzag effect), pressure on these shafts to tension the belt through rollers to urge the belt to turn and maintain in its desired orientation.

U.S. Pat. No. 4,135,664 to Resh relates to controlling lateral registration in printers. Specifically, a cylinder drum print is marked at a first print station with ink of a first color. The marks are scanned and a positional count is summed until the marks of a record station are detected, etc. By detection and averaging of the time differential between the lateral registration marks, lateral errors can be determined and overcome by physically shifting the lateral position of the print cylinder.

U.S. Pat. No. 4,963,899 to Resch, III, discloses an electrostatographic printing and copying device employs a registration system which senses discharge line patterns to provide both in-track and cross-track signal information to permit synchronous processing to provide accurate multi-color image reproduction.

GDR-A-239,390 to Schmeer, et al. discloses a device comprising a first and second set of proximity sensors which operator to signal a first off-center condition and, if the permissible lateral off-center condition is exceeded, the second proximity sensor shuts down the installation.

U.S. Pat. No. 4,569,584 to St. John et al. discloses a color electrographic recording apparatus having a single imaging station by which the recording medium is passed in a first and second direction. After each latent image is formed it is developed and the medium is returned to superpose another image up to the number of colors to be developed. The registration means are aligned tracking lines and registration lines to which are sensed to permit corrections of lateral and process direction errors.

U.S. Pat. No. 4,961,089 to Jamzadeh discloses an electrostatic reproduction apparatus having a web tracking system wherein the web rotates about image processing stations with a plurality of rollers. A guide means is provided to move the web around the rollers. The guide means include a steering roller which is actuated by according to a web tracking system.

The teachings of the above-referenced disclosures, however, have not relieved the need for a relatively low cost, simple and accurate registration system. That is a system permitting superposing successive images formed on a surface moving relative to the imaging stations by compensating for deviations in the travel of the belt from a predetermined aligned condition.

SUMMARY OF THE INVENTION

This invention is a means and method to compensate for lateral registration errors in printing machines adapted to form a composite image. Specifically, the invention comprises a plurality of image processing stations for forming composite images on an imageable surface movable relative to the image processing stations. Monitoring means are provided for determining the skew angle deviation of the belt relative to an aligned condition and to compute the lateral deviation of the surface at each of the image processing stations. The invention also includes means for laterally adjusting the image processing stations to compensate for the lateral deviations of the belt at each of the image processing stations.

The present invention further provides a means and method to compensate for both the lateral and process direction deviations in printing machines having a moving imageable surface passing between image processing stations to permit superposing registered images on the surface. The invention provides means for determining the process direction deviations in the movement of surface from a predetermined direction. Means for rotating the image processing stations are provided to adjust the angular orientation of the stations according to the predetermined direction. The lateral deviation is determined by the adjusted angular orientation and the stations are laterally adjusted to compensate for the lateral deviations at each of the stations.

Another feature of the invention is to provide a diagnostic routine for use in electrographic printers which provides compensation for the deviations from a set-up alignment or track. The present invention provides for tracking a photoconductive web, sensing deviations in the movement of the photoconductive web from the set-up track at each exposure station. The invention further provides for determining from the sensed deviations, the process and lateral deviations separately. It further provides for adjusting the orientation of the exposure stations in a rotational and lateral manner to compensate for the deviations of the web from the set-up track to permit accurate exposure of the desired portion of the photoconductive web.

DESCRIPTION OF THE DRAWINGS

Other features of the present invention will become apparent as the following description proceeds and upon reference to the drawings, in which:

FIG. 3 is a top elevational view of an exposure station of the illustrative printing machine of FIG. 1;

FIG. 4 is a section view of the exposure station of FIG. 3 taken along section line 4—4.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT OF THE INVENTION

For a general understanding of the features of the present invention, a description thereof will be made with reference to the drawings.

Figure 1:
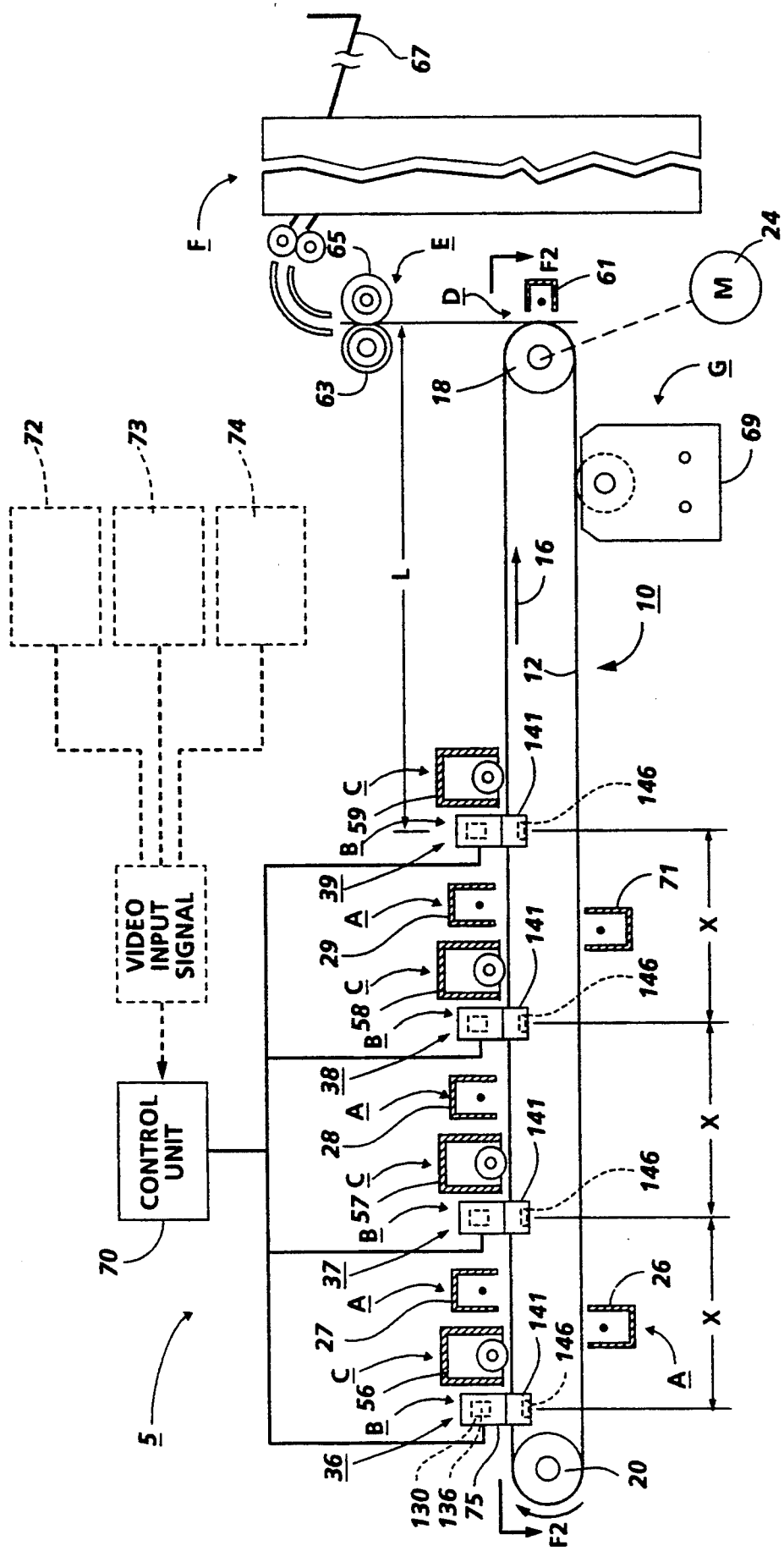
FIG. 1 is a schematic of an illustrative electrophotographic printing machine.
Figure 2:
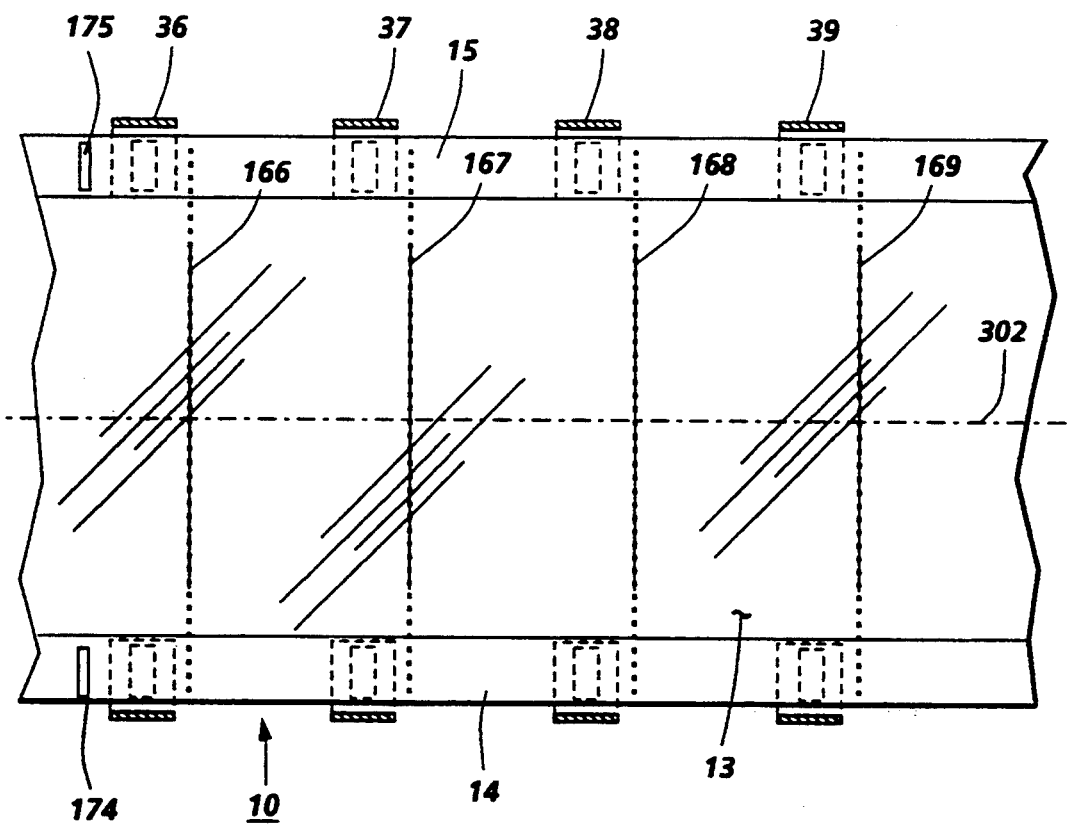
FIG. 2 is a top elevational view of the illustrative printing machine of FIG. 1 with portions omitted and with other portions in phantom for clarity.

FIG. 1 schematically depicts the various components of an illustrative electrographic printing machine 5 incorporating the present invention. FIG. 2 is a view of the illustrative printing machine looking onto the web of FIG. 1 with portions of the machine omitted above the section line 2—2 of FIG. 1 and others in phantom for clarity. In as much as the art of electrophotographic printing is well known, the various stations employed in the printing machine will be described only briefly.

As shown in FIG. 1 and FIG. 2, the printing machine utilizes a belt or web 10 with an electrical conductive substrate 12 (FIG. 2) on which is disposed a photoconductive surface 13 between edges 14 and 15 of the substrate 12. The web 10 moves in the direction of arrows 16 to advance successive portions thereof sequentially through the various conventional xerographic stations disposed about the path of movement of the web 10: charging station A, imaging station B, developing station C, transfer station D, fusing station E, finish station F and cleaning station G. Belt 10 is entrained about drive roller 18 and a tension roller 20. Motor 24 rotates roller 18 by suitable means such as a belt drive to advance the belt. The belt 10, rollers 18 and 24, and the motor 24 can be suitably mounted together to form a belt assembly which may be removably mounted in the copier 5. The tension roller is flexibly mounted to account for belt conicity and similar occurrences.

Essentially, the operation of the printing machine is as follows. A portion of the photoconductive surface 13 passing proximate the charging stations A is charged to a uniform potential. The charged portion then passes an imaging station B where parts of the charged photoconductive surface is selectively discharged to form a latent image thereon. The portion of the photoconductive surface 13 having the latent image thereon then passes to a developing station C which develops the latent image. The developed image on the photoconductive surface then passes to a transfer station D.

As seen in FIG. 1, the illustrative printing machine has a plurality of individual corona generators 26, 27, 28, and 29 which comprise the charging station A. It will be also apparent that the imaging station B comprises a series of light source units 36, 37, 38, and 39 disposed downstream of the corona generators 26, 27, 28, and 29. Likewise, after each of the light source units 36, 37, 38, and 39 are the magnetic brush developer units 56, 57, 58, and 59, which comprise the developing station C.

Thus, in the illustrative printing machine, a portion of the photoconductive surface 13 is charged to a uniform potential by the first corona generator 26. The charged portion of the surface 13 then passes to the first light source unit 36 where the photoconductive surface is selectively imaged by light from the light source unit 36 to form a latent image on the surface 13. The imaged portion of the surface 13 then passes the first magnetic brush developer unit 56, where the latent image is developed by a toner which is attracted from the magnetic brush developer unit 56. The developed portion of the surface 13 then passes the second series of corona generator 27, light source unit 37, and magnetic brush developer unit 57, which again charge, expose and develop the surface 13 in the previously described and known manner. Further, as is evident from this description and FIG. 1, the process of charging, exposing and developing are repeated as the surface 13 travels toward the transfer station D at units 28, 38 and 58 and units 29, 39 and 59, respectively. At the transfer station D, the developed images are transferred to a copy sheet generally provided from a tray along a copy handler path (not shown).

The transfer station D has a corona generator 61 which attracts the developed image from the photoconductive surface 13 onto the sheet. The sheet bearing the transferred image is then transported to the fusing station E. At fusing station E the image is permanently fixed to the sheet. In the present illustrative printer 5, heated roller 63 and back-up roller 65, through which the sheet is directed, are provided for this purpose. From the fusing station E, the sheet with the image fixed thereto passes to the finishing station E for processing, such as stapling or binding with other sheets, and ultimate delivery to tray 67.

The portion of the photoconductive surface 13 formerly bearing the developed image after passing the transfer station D then passes a cleaning station G. The cleaning station G in this case comprises a fibrous brush unit 69 for removing material on or near the surface of the web. It will be understood that an electrostatic brush unit could be substituted for the fibrous brush unit 69 to accomplish the same function. A discharge lamp 71 can be provided to discharge the photoconductive surface 13 of the web 10 prior to the beginning of another imaging cycle at the corona generator 26 of the charging station A.

As previously indicated, the imaging station B comprise the light source units 36, 37, 38 and 39 to form a series of latent images on the photoconductive surface 13. The units 36, 37, 38, and 39 are, in essence, exposure stations selectively actuated by control unit 70 which inputs video image signals to the light source units in a known manner to control the portions of the surface 12 being imaged. Thus, the control unit 70 and the light source units collectively comprise what is commonly referred to as an image output terminal. Likewise, the control unit 70 may receive video input signals from an image input terminal 72 (e.g., Raster Input Scanner) or other input device such as data storage device 73 (e.g. magnetic disk or tape drive) or an interactive interface device 74 (e.g. computer terminal) to determine the image signals delivered to the light source units 36, 37, 38 and 39, respectively. It should be further understood and appreciated that the interspersion of the components of the charging, imaging and developing stations provide a means for sequentially developing latent images which are superposed and which are then transferred simultaneously to a copy sheet.

Referring to FIG. 3 and FIG. 4, the light source unit 36, which is representative of the other exposure stations, is shown in greater detail. Specifically, the exposure station 36 consists of an outer housing 75 which is mounted on support frame 77 (see FIG. 4). An inner housing 130 has an LED array bar 136 secured therein. The inner housing is mounted to the outer housing by a slide mount arrangement 137 which allows translation of the inner housing 130 in a plane substantially parallel to the belt. Further, the outer housing is pivotally connected to frame which permits translation of the outer housing 75 with respect to the frame.

Stepper motor 138 is mounted to the outer housing 75 in a suitable fashion. Actuation of the stepper motor 138 selectively translates the inner housing 130 in a forward and reverse manner in the slide mount 137. Thus, actuation of the stepper motor 138 drives the inner housing in a linear fashion with respect to the outer housing 75. It will be appreciated that stops (not shown) may be provided in the housing 75 to limit the travel of the inner housing relative to the outer housing 75.

Stepper motor 139 is mounted on the frame 77 and actuation of the stepper motor 139 causes the outer housing 75 to rotate and, consequently, the LED array bar 136. In this embodiment, the stepper motors 138 and 139 have relatively small incremental step actuation so the linear movement and the stationary movement of the LED bar 136 is, by gear reduction units 140 incremented approximately 0.001 mm, thus avoiding the additional expense of a servo motor. Nevertheless, in certain applications one may use a servo motor or other suitably controlled actuation means. In summary, it will be understood that the LED bars can be linearly actuated and, further, can be rotational actuated to change the orientation of the LED bars 136 of each of the exposure stations 36, 37, 38 and 39 relative to the web 10. The stepper motors 138 and 139 in each of the light source units 36, 37, 38 and 39 are actuated by control signals from the control unit 40.

Still referencing FIG. 3 and FIG. 4, the outer housing 75 of exposure station 36 has L-shaped extending members 141 (see FIG. 1) and 142 which extend below the top surface of web 10 and extend between the upper and lower conductive substrate 12 of the web 10. Proximate to the ends of members, 141 and 142 are detectors 146 and 156, respectively. It will be understood that each of the other light source units 37, 38 and 39 are similarly constructed.

With specific to reference to FIG. 2, the portion of the L-shaped members 141 and 142 of the exposure stations 36, 37, 38 and 39, which extend between the upper and lower portions of the web 10, are shown in phantom. The lines 166, 167, 168 and 169 represent simultaneous scan lines of each of the LED bars 136 (see FIG. 4) of the light source units 36, 37, 38 and 39, respectively. FIG. 2 is intended to represent a condition of the web 10 passing the light source units with the edges of the web linearly parallel to one another and perpendicular to the LED light bars. Simply, in this instance, misregistration of the superposed images will be avoided so long as the video image signal output from the controller 70 to each of the light units are appropriately timed to compensate for the web travel between stations. That is, for example, the LED bar of light source unit 37 begins its scan, as the developed scan line 166 passes beneath it to superpose the images of the two exposure stations. Likewise, the light source units 38 and 39 are actuated by signals from control unit 70 as the first scan line 166 passes beneath them. Thus, by repeatedly actuating the downstream LED bars 136 of light source units 37, 38 and 39 for the second through the last line of an image exposed by the exposure station 36 the plurality of images exposed by each of the light source units 36, 37, 38 and 39 are superposed to form a single registered image. In the illustrative printing machine 5, the resultant image would be a multi-color image by virtue of the developing station 56, 57, 58 and 59 having black, cyan, magenta, and yellow toner disposed therein.

As seen in FIG. 2, edges 14 and 15 of the web 10 are provided with tracking indicia. In this case, apertures 174 and 175 are provided in the edges 14 and 15, respectively. The detectors 146 and 156 on the L-shaped member 141 and 142 detect the passage of the tracking indicia 174 and 175. In this in stance, the detectors 146 and 156 are optical detectors, which detect a designated or fiduciary diode of the LED arrays 136 in each of the light source units 36, 37, 38 and 39. The detectors 146 and 156 are connected to the control unit 70 to provide sense signals as the apertures 174 and 175 pass them. Further, it should be appreciated and understood that a practical solution is to have the LED bar extend over the photoconductive surface 13 and the edges 14 and 15 of the web 10. This will also be of a significant benefit as described below.

As shown in FIG. 1 and FIG. 2, each exposure station is shown a distance from the adjacent exposure station and the exposure station 39 is a distance "L" from the roller 20. Further, as shown in FIG. 2 the tracking indicia 174 is directly opposite 175. Finally, each of the detector sets and are positioned directly below the LED bars 136 of the light source units 36, 37, 38 and 39, respectively. These conditions, that the light source units 36, 37, 38 and 39 are equidistant from adjacent ones and that they are perpendicular to each, along with the previously mentioned web conditions constitute, of course, an ideal case. It will, however, afford ease in explanation, the invention herein, as this case also demonstrates the required initialization of the units 36, 37, 38 and 39 relative to the web 10 so that scan lines of each of the units are perpendicular to the web travel or the process director. That is, the reference could be provided by the factory or field set up or even the previous correction routine can provide the necessary reference values for the distance between the stations: the rotational position of the bars to form superposed images on the web in the process direction (i.e., to have parallel scan lines at each exposure station), and the lateral position of each of the bars to form superimposed images on the web in lateral direction (i.e., to have the pixels of the parallel scan lines be superposed). These values are then stored in the control unit 70 in a customary manner. Another stored value is the gap between detection of the aperture 174 and 175, as changes in the gap is indicative of changes in both lateral and process directional registration.

The initialization process may be accomplished in a variety of known manners. For example, the co-pending applications, previously incorporated herein by reference, U.S. applications Ser. Nos. 07/807,931 and 807,927, both filed on Dec. 16, 1991 which are assigned to Xerox Corporation, are assigned attorney Docket Nos. D/91032 and D/91032Q, and are entitled "Method and Apparatus for Delivering Multiple Image Print Bars in a Single Pass System" and "Method and Apparatus for Image Registration in a Single Pass ROS System", respectively, teach a method and means for initially aligning the image output devices of those systems as well as provide a process direction correcting routine. Other initial alignment methods may be employed including, of course, trial and error. It will be appreciated that the present invention merely requires that the initialization be accomplished to provide the reference values for alignment sequences thereafter to compensate for changes from the reference.

Once initialized, video signals from the control unit 70 actuate selectively individual portions of the LED bars 136 of each of the exposure units 36, 37, 38 and 39 on a delayed basis to image the photoconductive surface 12 as the web turns on rollers 18 and 20 resulting in superposed images. It will be appreciated that other indicia may be provided or used in conjunction with the indicia of the present invention to control speed or distance travel for imaging at the sequential stations. Nevertheless, over time misalignment with respect to one or more exposure stations of the web often becomes apparent in the form of misaligned and poor quality prints. Further, after each power down or substantial delay in copying, misalignment may become apparent. This problem can result from a variety of problems including, by way of example, misalignment of the belt, stretching or shrinkage of the belt and the like. Thus, in this case use of the initial rotational and lateral position values for each of the stations stored in the control unit 70 for the exposure stations 36, 37, 38 and 39 result in misregistered images.

Figure 5:
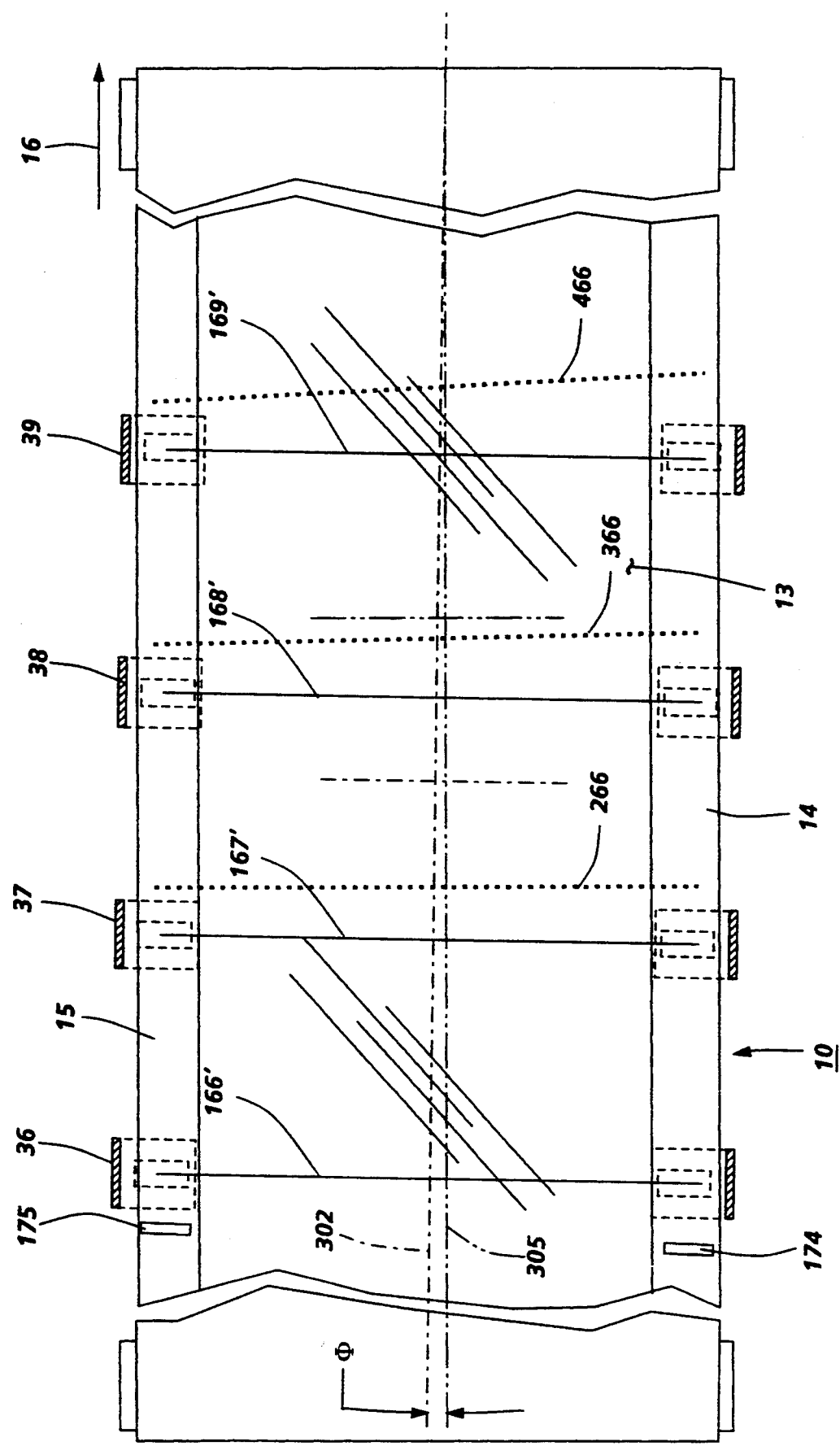
FIG. 5 is a top elevational view similar to FIG. 2 illustrating the mistracking of the belt relative to the exposure stations.

The problem can be illustrated by assuming the web 10 exhibits the condition shown in FIG. 5 which differs from the initial set values shown in FIG. 2. That is, the original process direction illustrated by line 302, which is parallel to the direction of travel of the web 10 in FIG. 2, and line 305, which is parallel to the direction of travel of the web 10 in FIG. 5, define a O angle. In this case, each scan line 166', 167' and 168' from each of the light source units 36, 37, 38, and 39, respectively, are rotated from the new process direction by some angle. It will be further clear that scan lines 166', 167', 168', and 169' from each of the LED bars 136 will rotate and translate relative to the scan line of each downstream station as they move with the belt. This is due to the misalignment of the web, the web moves relative to the exposure stations in both the process and lateral directions (see, for example, scan lines 266, 366 and 466 which represent scan line 166 as it moves with the web 10 passing the light source units 37, 38 and 39, respectively.

As previously stated, the detectors 146 and 156 generate signals to the control unit 70 upon passage of the indicia 174 and 175, respectively,. In this instance, the signals to the control unit indicate a difference between the passage of indicia the 174 and 175 from the preset values at one or more of the detectors mounted on the units 36, 37, 38 and 39. Simply, as illustrated in FIG. 5 the misalignment of web 10 with the units causes as the signal from detector 156 to precede the signal from detector 146, as compared to the simultaneous signals received by the detectors 146 and 156 of FIG. 2. In any event, any change in passage of the indicia is indicative of the direction of rotation of the LED 136 for each unit and the magnitude of the delay is indicative of the magnitude of rotational angle necessary to align the associated LED bar 136. As is well known, the trailing or leading edges of the indicia on each side of the web 10 can be used as a reference edge to insure greater accuracy.

Rotation of each of the LED bars 136 through the appropriate angle to meet the alignment condition (in this case where the indicia 174 and 175 pass coincidentally (See FIG. 6)), the bars have been rotated to be perpendicular to the travel of the web. Thus, each of the exposure stations can again be properly aligned by rotating each until the preselected condition is met. That is, when the time or distance (preferably distance) between the sensing of each of the indicia at the side of each exposure station is the same as the initial condition. This process will accomplish alignment of the light sources units relative to each other and the process direction of the belt. Note, this does not mean that the stations are perpendicular to the belt because as previously stated, for example, a belt may often exhibit conicity or other such problems. However, this does not end the misalignment error, as the rotation of the imaging station only eliminates process direction errors. The scan lines placed by one or more of stations, if any stations are rotated, are lateral displaced with respect to scan lines of the other stations.

Figure 6:
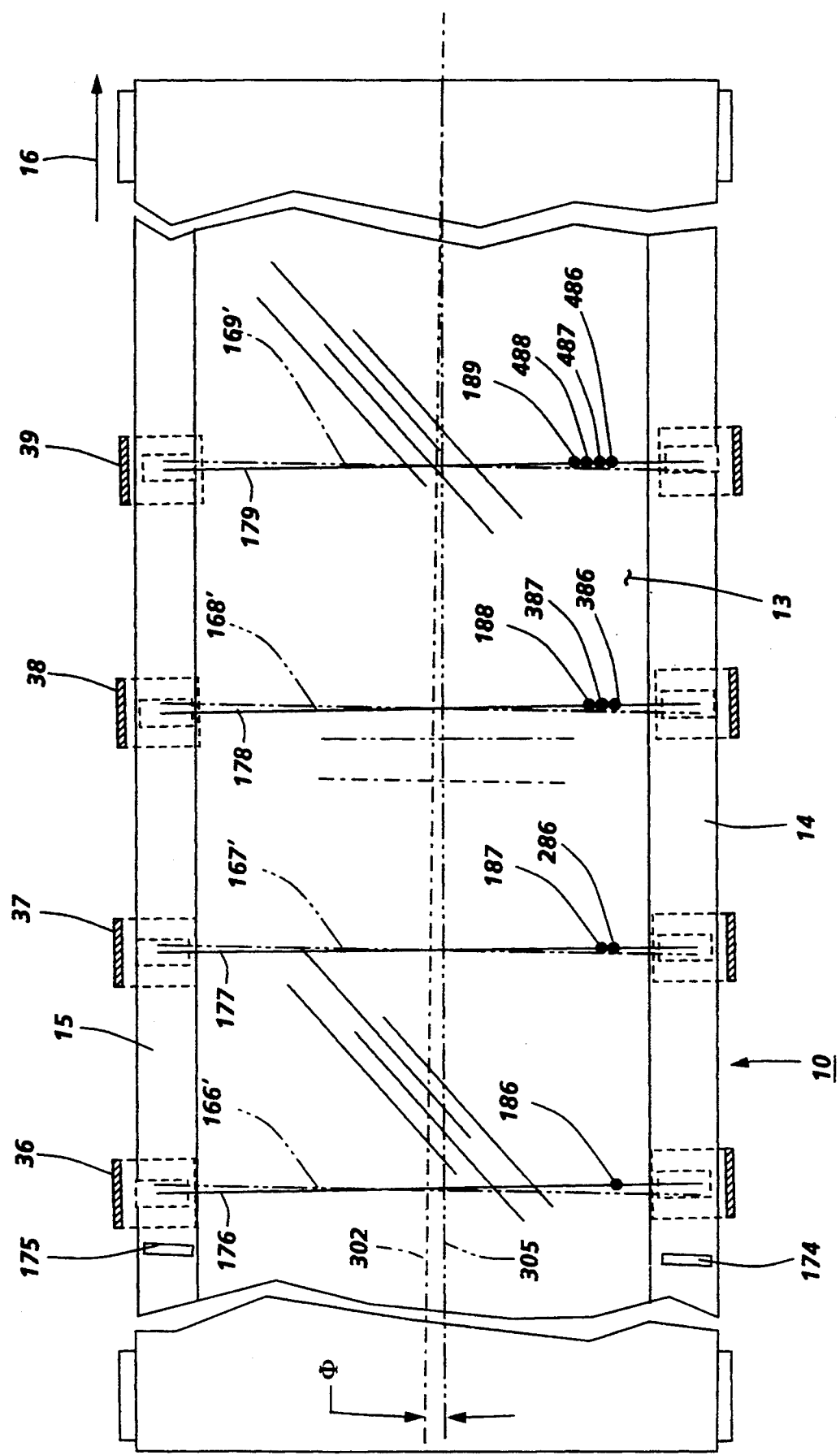
FIG. 6 is a top elevational view similar to FIG. 5 illustrating the rotation of the exposure stations relative to the belt and remaining lateral deviation of the stations respective scan lines.

This problem is illustrated in FIG. 6, where each of the light source units 36, 37, 38, and 39 have been rotated by an appropriate angle to meet the initial condition. That is, the scan lines of each of the units pass downstream units be parallel to the scan line of such downstream unit. That is, the scan line from unit are perpendicular to the process direction of the web. However, a lateral registration error is apparent in FIG. 6. Dots 186, 187, 188, and 189 represent the beginning pixel of each of the scan lines place by the LED bars 136 of the units 36, 37, 38, and 39. The dots 186, 187, 188, and 189, are lateral displaced relative to each other as the web 10 travels around the drive roller. This is demonstrated by the lateral position of dot 286, which is the position of dot 186 upon passing the unit 37, relative to the dot 187; by the lateral positions of dots 386 and 387, which are the positions of dots 186 and 187 upon passing under the unit 38, relative to the dot 188; and the lateral positions of dots 486, 487, and 488, which are the positions of dots 186, 187 and 188 upon passing under the unit 39, relative to the dot 189.

Applicant has found that by sensing the angular displacement of the light source units, or for that matter any of the possible image output sources, and knowing the distances between stations, the lateral correction to achieve registration can be found without use of further detectors, special sized and/or shaped indicia, or other like means. Rather, Applicant has found that the determination of the angular displacement of the web or other imageable substrate from the original or initialized process direction, yields sufficient information to calculate the lateral deviation of the scan lines along the web 10.

Thus, for example, the lateral displacement or lateral registration error of the scan lines can be compensated for by comparing the $\ominus$ values for each of the stations and employing a computed look-up table (LUT) to determine the O angle, the skew angle of the belt from the original or set-up process direction. The O angle can also be determined through the use of an appropriate algorithms such as the least squares method, solving for the linearized slope defined by the distance from the tension roller and associated $\ominus$ value at that distance. (see i.e., the graph of FIG. 7). Other methods may be appropriate dependent upon environmental considerations and printing machine characteristics.

Once the O angle is determined, the lateral deviation at each station can be determined with relative ease. As one example, a LUT representing the sine of the determine O angle could be appropriate, or the control unit, if as preferred is a microprocessor, can calculate the lateral deviation at each light exposure unit, for example, by multiplying the distance of the particular unit from the drive roller times the sine of the angle O. Thus, the controller can compensate by actuating a part of the LED bars 136 offset from the original setup condition, provided that the LED bars 136 are oversized as previously stated.

It should be appreciated that each of the stepper motors 138 need only operate to move one of the LED bars 136 a relatively small distance, approximately one pixel (i.e., $\pm\frac{1}{2}$ pixel in a positive and in a negative direction), if, as previously noted, the LED bars preferably extend over and beyond the detectors 146 and 156 at each end so that the fiduciary or dedicated detector source is provided. Thus, the translation of LED bars 136 by stepper motor 138 can be limited to half pixel corrections and similar fractional portions of pixels of larger corrections which are provided for by offsetting the active portions of the LED bars. The LED bars 136 are in this case conventional light emitting diode arrays with a resolution of 600 spots per inch and pixel size of 30×40 microns on 42.33 centers. Thus, each pixel is approximately 0.04 mm.

Figure 7:
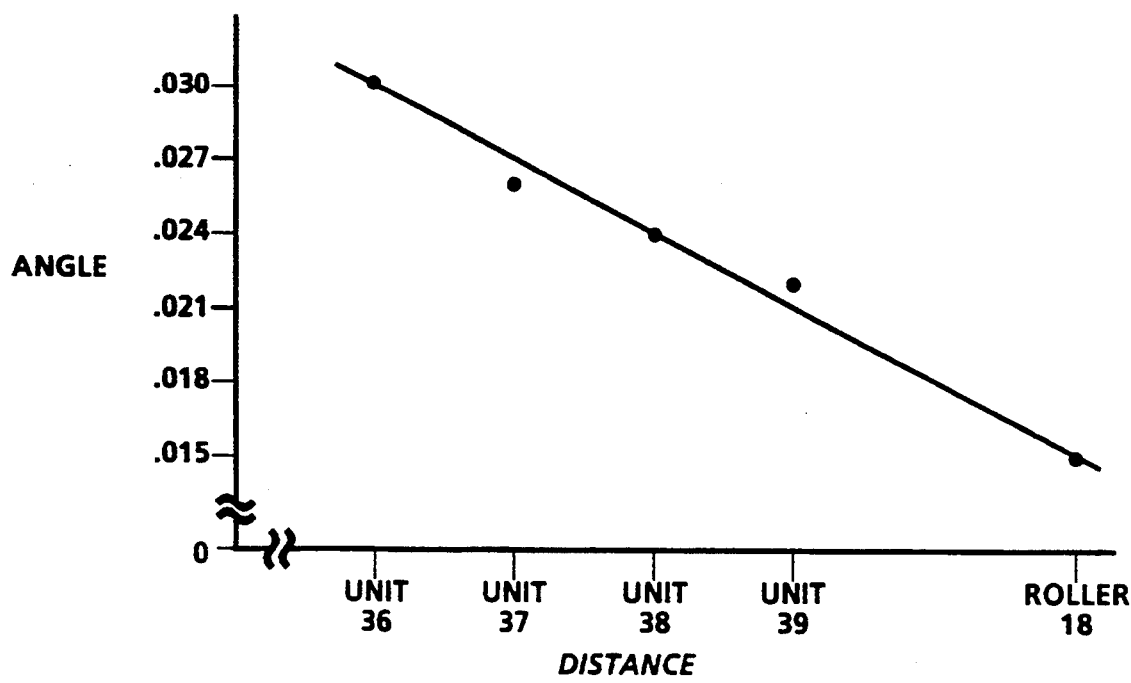
FIG. 7 is a graph indicative of one manner for determining the skew angle of the belt used to determine the lateral registration error.

For example, as shown in FIG. 6 and as graphically represented in FIG. 7 each of the light source units have been an through an angle relative to the reference angle. The angle of rotation can be determined, for example, by counting the steps of actuation of each of the stepper motors 139 for each of the units 36, 37, 38, and 39, as well as accounting for the gear box 40. Thus, as shown in FIG. 7, it will be appreciated that the angle $\ominus_1$ is 0.030°, $\ominus_2$ is 0.026°, $\ominus_3$ is 0.023°, and $\ominus_4$ is 0.022°; that the distance between the stations, "X", is 15 cm; and the distance between the last station and the drive roller, "L", is 30 cm. It will be recognized that the graph depicted in FIG. 7 is offset some distance along the X-axis.

The slope of the angles plotted against the distance is −0.003° per 5 cm with the O angle being determined to be 0.015° at the drive roller 18, as shown in FIG. 7. The lateral registration error for each of the stations after rotation the appropriate ⊖ angle is then computed by the distance of the stations from the roller 18 as follows:

unit 36 (3X+L) sin O=75 cm×sin 0.015°=0.1963 mm;

unit 37 (2X+L) sin O=60 cm×sin 0.015°=0.1571 mm;

unit 38 (X+L) sin O=45 cm×sin 0.015°=0.1178 mm; and unit 39 (L) sin O. =30 cm×sin 0.015°=0.0785 mm.

Thus, by moving the LED bars 136 of each of the stations laterally through offsetting the portions actuated and by actual movement of the bars by the stepper motors 138, the lateral registration errors in composite images formed by the stations can be substantially eliminated. It will also be apparent that the stepper motor 138 for linear actuation of one of the stations can be eliminated with the other units compensating therefor.

The application of this invention should now be apparent. It can be implemented with a wide variety of printing machines in a number of manners, particularly as a diagnostic routine. That is, after the previously discussed set-up or initialization of the printing machine, the positions, both rotational and lateral, of the image processing stations are stored, preferably in a nonvolatile memory device which can be referenced by the control unit. The stored values could be changed after every routine or only changes stored. Thus, for example, at each power-up a diagnostic routine is done to provide registration correction. Other possible utilization of invention could include a user initiated routine, as well as machine initiated after some occurrence, e.g., length of use, prints produced, or some sensed characteristic like environmental change, power supply change or the like.

It will be understood by those skilled in the art that the present invention, while described in terms of a xerographic printer having a plurality of light bar sources comprising the imaging station, has application within other xerographic printers employing other imaging means including, for example, raster output scanners. The present invention has applications in other single pass printers, as well. Specifically, it should now be appreciated that the present invention is applicable to any printer which provides multiple images which, prior to finishing, are superimposed on an imageable moving substrate by image processing means. By way of example, the present invention would have application in plotters, and the like, employing a web transport to move an imageable surface through image processing stations which apply a series of images to the surface to form a composite image thereon. Likewise, the present invention applies to other electrographic printers including ionographic devices.

It should also be apparent that there has been provided in accordance with the present invention, a means and a method that fully satisfy the aims and advantages previously set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A printing device for providing color prints comprising:
    an imageable surface;
    a plurality of image processing stations for forming a composite image on said imageable surface;
    transport means for moving the imageable surface along a predetermined course between said processing stations;
    a first indicia on said transport means;
    a second indicia laterally spaced from said first indicia on said transport means;
    means for sensing said first and second indicia to detect skew angle deviations of said imageable surface from the predetermined course of said imageable surface;
    means for selecting a lateral registration error for said image processing stations as a function of the detected skew angle deviations; and
    means, responsive to said selecting means, for linearly adjusting said image processing stations substantially laterally relative to the predetermined course of said imageable surface to compensate for lateral deviations thereby enhancing the registration of the composite image on said surface.

2. The printing device of claim 1, further comprising control means, responsive to said sensing means, for transmitting signals to said linear adjusting means.

3. The printing device of claim 1, further comprising:
    means for angular translation of said image processing stations to compensate in the direction of movement for detected skew angle deviations from the predetermined course by said sensing means; and
    control means, responsive to said sensing means, for transmitting actuating signals to said linear adjusting means and said angular translation means to compensate for skew angle deviations from the predetermined course.

4. The printing device of claim 3, wherein said transport means is a web with the imageable surface thereon and said indicia are positioned on opposite sides of said surface.

5. A method for use in electrographic printing machines to compensate for process and lateral deviation in prints resulting from skew deviation of an imaging surface from a predetermined course comprising the steps of:
    (a) moving an imageable surface adjacent image processing stations;
    (b) moving first indicium and second indicium with and proximate to the imageable surface;
    (c) sensing the first indicium and the second indicium;
    (d) generating signals indicative of the sensing of the indicia;
    (e) referencing stored signals indicative of a reference position of the indicia;
    (f) comparing the sensed signals of the first indicium and second indicium with reference signals for each of the indicia to develop an error signal indicative of the skew deviation at each such station;
    (g) selecting a lateral registration error for each such station as a function of the developed error signal indicative of the skew deviation for each such station with respect to the imageable surface; and
    (h) adjusting the lateral orientation of the stations relative to the imageable surface to substantially reduce any lateral registration error of such station resulting from the skew deviation of the imaging surface.

6. The method of claim 5, further comprising the steps of:
(i) selecting a registration error in the direction of movement of the imageable surface for each such station as a function of the developed error signal indicative of the skew deviation for each such station with respect to the image, develop an error signal indicative of the skew deviation at each such station; and
(j) adjusting, responsive to said step of comparing, the angular orientation of the stations relative to the surface to substantially reduce registration errors wherein said step of selecting includes calculating both lateral registration errors and process direction registration errors.

7. The method of claim 6 further comprising the step of:
(k) repeating the steps of (a) through (j) until the change between the reference signal and sensed are below a threshold value; and
(j) storing the adjusted linear and angular positions of the stations as reference values after completion of steps (a) through (h).

* * * * *